United States Patent
Chan et al.

(10) Patent No.: US 9,443,355 B2
(45) Date of Patent: Sep. 13, 2016

(54) REPROJECTION OLED DISPLAY FOR AUGMENTED REALITY EXPERIENCES

(71) Applicant: MICROSOFT TECHNOLOGY LICENSING, LLC, Redmond, WA (US)

(72) Inventors: Calvin Chan, Bellevue, WA (US); Jeffrey Neil Margolis, Seattle, WA (US); Andrew Pearson, Redmond, WA (US); Martin Shetter, Bellevue, WA (US); Ashraf Ayman Michail, Kirkland, WA (US); Barry Corlett, Brisbane, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 323 days.

(21) Appl. No.: 13/931,554

(22) Filed: Jun. 28, 2013

(65) Prior Publication Data

US 2015/0002542 A1    Jan. 1, 2015

(51) Int. Cl.
| | |
|---|---|
| G06T 19/00 | (2011.01) |
| G06F 3/048 | (2013.01) |
| G02B 27/01 | (2006.01) |
| G09G 3/00 | (2006.01) |
| G09G 3/32 | (2016.01) |

(52) U.S. Cl.
CPC .......... *G06T 19/006* (2013.01); *G02B 27/017* (2013.01); *G06F 3/048* (2013.01); *G09G 3/003* (2013.01); *G09G 3/007* (2013.01); *G09G 3/3225* (2013.01); *G02B 2027/014* (2013.01); *G02B 2027/0187* (2013.01); *G09G 2300/0804* (2013.01); *G09G 2340/0435* (2013.01); *G09G 2340/0471* (2013.01); *G09G 2340/0478* (2013.01)

(58) Field of Classification Search
None
See application file for complete search history.

(56) References Cited

U.S. PATENT DOCUMENTS

| | | | |
|---|---|---|---|
| 5,684,498 A | 11/1997 | Welch | |
| 5,748,872 A | 5/1998 | Norman | |
| 5,945,972 A * | 8/1999 | Okumura | G09C 3/3648 345/100 |
| 8,212,859 B2 | 7/2012 | Tang et al. | |
| 2003/0132901 A1* | 7/2003 | Shimada | 345/87 |

(Continued)

OTHER PUBLICATIONS

PCT International Search Report dated Oct. 16, 2014; PCT Patent Application No. PCT/US2014/047714.

(Continued)

*Primary Examiner* — Sultana M Zalalee
(74) *Attorney, Agent, or Firm* — Dan Choi; Judy Yee; Micky Minhas

(57) ABSTRACT

Methods for generating and displaying images associated with one or more virtual objects within an augmented reality environment at a frame rate that is greater than a rendering frame rate are described. The rendering frame rate may correspond with the minimum time to render images associated with a pose of a head-mounted display device (HMD). In some embodiments, the HMD may determine a predicted pose associated with a future position and orientation of the HMD, generate a pre-rendered image based on the predicted pose, determine an updated pose associated with the HMD subsequent to generating the pre-rendered image, generate an updated image based on the updated pose and the pre-rendered image, and display the updated image on the HMD. The updated image may be generated via a homographic transformation and/or a pixel offset adjustment of the pre-rendered image by circuitry within the display.

20 Claims, 15 Drawing Sheets

(56) References Cited

U.S. PATENT DOCUMENTS

| | | | |
|---|---|---|---|
| 2006/0078215 A1* | 4/2006 | Gallagher | G06T 3/00 382/254 |
| 2006/0232665 A1 | 10/2006 | Schowengerdt | |
| 2007/0273926 A1* | 11/2007 | Sugiyama | H04N 7/163 358/1.18 |
| 2008/0297437 A1 | 12/2008 | Takahashi | |
| 2010/0002909 A1* | 1/2010 | Lefevre | G06F 3/04815 382/103 |
| 2010/0026714 A1* | 2/2010 | Utagawa | G02B 27/017 345/633 |
| 2010/0045701 A1 | 2/2010 | Scott et al. | |
| 2011/0018903 A1 | 1/2011 | Lapstun et al. | |
| 2012/0105473 A1 | 5/2012 | Bar-Zeev | |
| 2012/0154277 A1* | 6/2012 | Bar-Zeev | G02B 27/017 345/158 |
| 2012/0243732 A1 | 9/2012 | Swaminathan | |
| 2012/0268490 A1 | 10/2012 | Sugden | |
| 2013/0083173 A1 | 4/2013 | Geisner et al. | |
| 2014/0285690 A1* | 9/2014 | Benedetti | G06T 3/00 348/241 |
| 2015/0170418 A1* | 6/2015 | Flynn | G06F 3/04815 345/633 |

OTHER PUBLICATIONS

PCT Written Opinion of the International Searching Authority dated Oct. 16, 2014; PCT Patent Application No. PCT/US2014/047714.
PCT International Search Report dated Nov. 7, 2014; PCT Patent Application No. PCT/US2014/044386.
PCT Written Opinion of the International Searching Authority dated Nov. 7, 2014; PCT Patent Application No. PCT/US2014/044386.
Burbidge, et al., "Hardware Improvements to the Helmet Mounted Projector", Published on: Sep. 5, 1989, Available at: http://proceedings.spiedigitallibrary.org/proceeding.aspx?articleid=1258848.
Evrydayvr, "Oculus Rift-How Does Time Warping Work?", Published on: Apr. 19, 2014, Available at: http://www.youtube.com/watch?v=WvtEXMIQQti.
Mark, et al., "Post-Rendering 3D Warping", In Proceedings of Symposium on Interactive 3D Graphics, Apr. 30, 1997, pp. 7-16.
Richard, et al., "Compensating Lags in Head-Coupled Displays Using Head Position Prediction and Image Deflection", In Journal of Aircraft, vol. 29, Issue 6, Nov. 1992, pp. 1064-1068.
Office Action dated Apr. 7, 2015, U.S. Appl. No. 13/951,351.
"Second Written Opinion Received for PCT Patent Application No. PCT/US2014/047714", Mailed Date: Apr. 2, 2015, 9 Pages.
PCT Demand for International Preliminary Examination (Chapter II), filed Feb. 4, 2015.
Azuma, Ronald, and Gary Bishop. "Improving static and dynamic registration in an optical see-through HMO." Proceedings of the 21 st annual conference on Computer graphics and interactive techniques. ACM, 1994.
Gleue, Tim, and Patrick Dahne. "Design and implementation of a mobile device for outdoor augmented reality in the archeoguide project." Proceedings of the 2001 conference on Virtual reality, archeology, and cultural heritage. ACM, 2001.
Mark, William R., and Gary Bishop. Post-rendering 3 0 image warping: visibility, reconstruction, and performance for depthimage warping. Diss. University of North Carolina at Chapel Hill, 1999.
Mine, Mark, and Gary Bishop. "Just-in-time pixels." University of North Carolina at Chapel Hill Technical Report TR93-005 (1993).
Pasman, et al., "Low Latency Rendering for Mobile Augmented Reality", In International Journal/Conference Paper of UbiCom, Dec. 1999, 9 pages.
Jacobs, et al., "Managing Latency in Complex Augmented Reality Systems", In Proceedings of the ACM Symposium on Interactive 3D Graphics, Apr. 27, 1997, 7 pages.
Bimber, Oliver, "Interactive Rendering for Projection-Based Augmented Reality Displays", In Doctoral dissertation, University of North Carolina, Sep. 2, 2002, 214 pages.
U.S. Appl. No. 13/951,351, filed Jul. 25, 2013, titled "Late Stage Reprojection,".
Office Action dated Oct. 14, 2015, U.S. Appl. No. 13/951,351.
Response to Office Action dated Jul. 7, 2015, U.S. Appl. No. 13/951,351.
PCT International Preliminary Report dated Aug. 18, 2015; PCT Patent Application No. PCT/US2014/044386.
Response to Office Action dated Feb. 11, 2016, U.S. Appl. No. 13/951,351.
Office Action dated Mar. 28, 2016, U.S. Appl. No. 13/951,351.
Yanagida, Yasuyuki, Masahiko Inami, and Susumu Tachi. "Improvement of Temporal Quality of HMO for Rotational Motion." (Oct. 1998).
Kijima, Ryugo, Eijiroh Yamada, and Takeo Ojika. "A development of reflex HMO-HMO with time delay compensation aapability." Proc. 2nd Int'l Symp. Mixed Reality. 2001.
Response to Office Action dated Jun. 28, 2016, U.S. Appl. No. 13/951,351.

* cited by examiner

REPROJECTION OLED DISPLAY FOR AUGMENTED REALITY EXPERIENCES

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular pose associated with the mobile device that needs to be augmented as the mobile device moves within the real-world environment.

An AR environment may be provided to an end user of a mobile device using an electronic display (e.g., an LED display integrated with a head-mounted display device). The electronic display may display images of virtual objects to the end user by modulating light provided to the electronic display (e.g., a liquid crystal on silicon display) or by generating light within the electronic display (e.g., an OLED display). An OLED, or organic light emitting diode, is an LED in which the emissive electroluminescent layer comprises an organic film. An OLED display may comprise a passive matrix OLED display or an active matrix OLED display. An active matrix OLED display uses one or more thin-film transistors (TFTs) within each OLED pixel for controlling the amount of light generated per pixel. In one example, each OLED pixel may comprise a first TFT for driving an OLED and a second TFT for latching data for controlling the first TFT. The TFTs may comprise polysilicon TFTs or amorphous silicon TFTs. In some cases, an OLED display may comprise groups of red, green, and blue emitting sub-pixels (i.e., each of the OLED pixels may comprise a plurality of LEDs for generating red, green, and blue light). An OLED display may also comprise groups of cyan, yellow, magenta, and white emitting sub-pixels.

SUMMARY

Technology is described for generating and projecting images associated with one or more virtual objects within an augmented reality (AR) environment at a frame rate that is greater than a rendering frame rate. The rendering frame rate may correspond with the minimum time to render images associated with a particular pose of a head-mounted display device (HMD). In some embodiments, the HMD may determine a predicted pose associated with a future position and orientation of the HMD (e.g., a predicted pose of the HMD 8 ms or 16 ms in the future), generate a pre-rendered image based on the predicted pose, determine an updated pose associated with the HMD subsequent to generating the pre-rendered image, generate an updated image based on the updated pose and the pre-rendered image, and display the updated image on the HMD. The updated image may be generated via a homographic transformation and/or a pixel offset adjustment of the pre-rendered image by circuitry within a display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
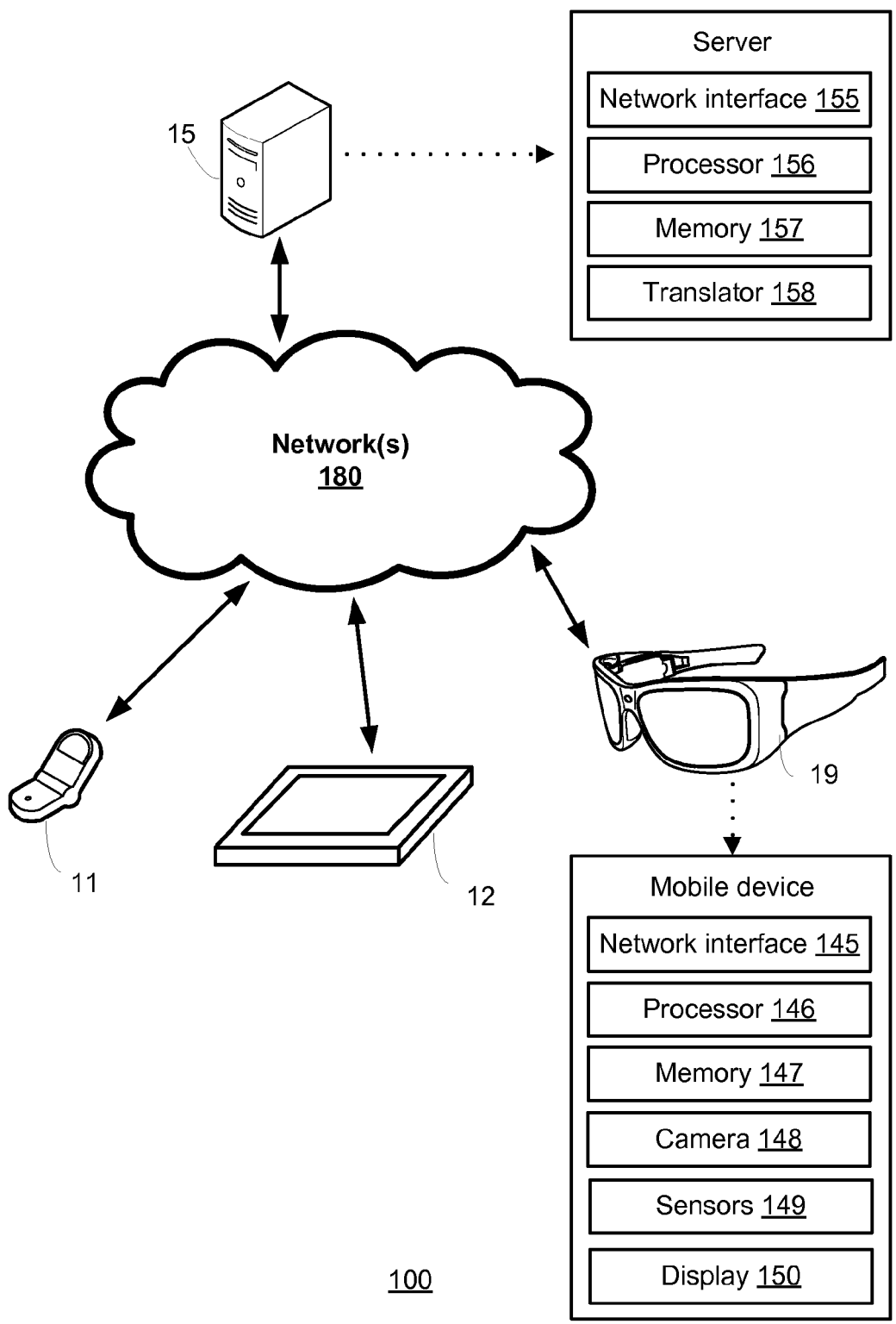
FIG. 1 is a block diagram of one embodiment of a networked computing environment in which the disclosed technology may be practiced.

Technology is described for generating and displaying images associated with one or more virtual objects within an augmented reality (AR) environment at a frame rate that is greater than a rendering frame rate and for improving virtual object stability. The displayed images may include late stage graphical adjustments of pre-rendered scenes (i.e., forward predicted scenes that are rendered at the rendering frame rate) in order to incorporate higher frequency pose estimates. The rendering frame rate may correspond with the minimum time to render images associated with a pose of a head-mounted display device (HMD). In some embodiments, the HMD may determine a predicted pose associated with a future position and orientation of the HMD (e.g., a predicted pose of the HMD 10 ms or 20 ms in the future), generate a pre-rendered image based on the predicted pose, determine an updated pose associated with the HMD subsequent to generating the pre-rendered image or concurrent with the pre-rendered image being generated, generate an updated image based on the updated pose and the pre-rendered image, and display the updated image on the HMD. The updated image may be generated via a homographic transformation and/or a pixel offset adjustment of the pre-rendered image by circuitry within the display.

In some embodiments, the predicted pose may be determined based on a current position and orientation of the HMD and an acceleration and a velocity of the HMD immediately prior to determining the predicted pose (e.g., by extrapolating the predicted pose based on movement of the HMD 5 ms or 10 ms prior to determining the predicted pose). The updated pose may be determined based on updated pose information that is provided to a pose tracker at a higher frequency than the rendering frame rate. In one example, the updated pose information may be generated using a low-latency inertial measurement unit (IMU) or combination of IMU and camera-based pose tracking. The updated image may comprise an image rotation, translation, resizing (e.g., stretching or shrinking), shifting, or tilting of at least a portion of the pre-rendered image in order to correct for differences between the predicted pose and the updated pose (e.g., to compensate for an incorrect pose prediction when generating the pre-rendered image). The updated image may be generated via a homographic transformation of the pre-rendered image. In some cases, the homographic transformation may comprise an affine transformation. The updated image may be generated using a pixel offset adjustment or a combination of homographic transformations and pixel offset adjustments. In some cases, the homographic transformations and/or pixel offset adjustments may be generated downstream from the core rendering pipeline (e.g., using a controller or processor integrated with the display). In one embodiment, the pixel offset adjustments may be performed using a display that incorporates shift registers or other circuitry for allowing the shifting of pixel values within a pixel array of the display (e.g., similar to the operation of a charge-coupled device).

In some embodiments, the updated images comprising late stage graphical adjustments of forward predicted rendered images may be generated using various image reprojection techniques of varying computational complexity. The image reprojection techniques may include per pixel reprojection (e.g., where each pixel of a rendered image is reprojected based on an updated pose), multi-plane homography (e.g., where multiple rendered images associated with multiple planes within a 3D scene are used to generate the composite updated image), single plane homography (e.g., where a single rendered image associated with a single plane within a 3D scene is used to generate the updated image), affine homography, and pixel offset based adjustments. The 2D plane (or a set of one or more 2D planes) within a 3D scene may be determined based on which virtual objects the end user of an HMD has been focusing on within a particular period of time. In one example, eye tracking may be used to determine the most frequently viewed virtual objects within the particular period of time (e.g., within the previous 50 ms or 500 ms). In the case of a single plane, the single plane may be selected based on a depth of the most frequently viewed virtual object within the particular period of time (i.e., the single plane may be set based on the location of the most frequently viewed virtual object within the augmented reality environment). In the case of multiple planes, virtual objects within an augmented reality environment may be segmented into a plurality of groups based on proximity to the multiple planes; for example, a first virtual object may be mapped to a near plane if the near plane is the closest plane to the first virtual object and a second virtual object may be mapped to a far plane if the far plane is the closest plane to the second virtual object. A first rendered image may then be generated including the first virtual object based on the near plane and a second rendered image may be generated including the second virtual object based on the far plane.

In some embodiments, different graphical adjustments may be performed on different portions of a pre-rendered image in order to incorporate higher frequency pose estimates. In one example, a first homographic transformation associated with a first pose of an HMD at a first point in time may be applied to a first portion of the pre-rendered image (e.g., a top portion of the pre-rendered image) and a second homographic transformation associated with a second pose of the HMD at a second point in time subsequent to the first point in time may be applied to a second portion of the pre-rendered image different from the first portion (e.g., a bottom portion of the pre-rendered image). In the case of a scanning display or a progressive scanning display, the first homographic transformation may be applied to pixels associated with a first set of scan lines and the second homographic transformation may be applied to pixels associated with a second set of scan lines different from the first set of scan lines. In one embodiment, the first homographic transformation may be applied to a single first scan line and the second homographic transformation may be applied to a single second scan line (i.e., homographic transformations may be applied on a per scan line basis).

One issue with generating a realistic augmented reality environment relates to the latency or amount of time in which images of world-locked virtual objects corresponding with a particular pose of an HMD are displayed to an end user of the HMD. For example, if too much time lapses between the time the end users head turns away from the particular pose and the time an image of a virtual object is displayed based on the particular pose, then the virtual object will appear to drift away from its intended location within the augmented reality environment (i.e., the image may not appear to be aligned with an intended real-world location or object). Thus, there is a need to display correctly aligned images of virtual objects to an end user in order to improve virtual object stability and to improve the augmented reality experience.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display. Display 150 may comprise an LED or OLED display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, an HMD, such as mobile device 19, may use images of an environment captured from an outward facing camera in order to determine a six degree of freedom (6DOF) pose corresponding with the images relative to a 3D map of the environment. The 6DOF pose may comprise information associated with the position and orientation of the HMD within the environment. The 6DOF pose may be used for localizing the HMD and for generating images of virtual objects such that the virtual objects appear to exist at appropriate locations within the environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

In some embodiments, an HMD, such as mobile device 19, may display images of virtual objects within an augmented reality (AR) environment at a frame rate that is greater than a rendering frame rate for the core rendering pipeline or rendering GPU. The HMD may modify pre-rendered images or forward predicted images that are rendered at the rendering frame rate based on updated pose estimates that are provided at a higher frequency than the rendering frame rate. In some embodiments, the HMD may generate the pre-rendered image based on a predicted pose at the rendering frame rate (e.g., every 16 ms), determine one or more updated poses associated with the HMD subsequent to generating the pre-rendered image (e.g., every 2 ms), generate one or more updated images based on the one or more updated poses and the pre-rendered image, and display the one or more updated images on the HMD. In some cases, the one or more updated images may be generated via homographic transformations and/or a pixel offset adjustments using circuitry within the display, such as display 150.

Figure 2A:
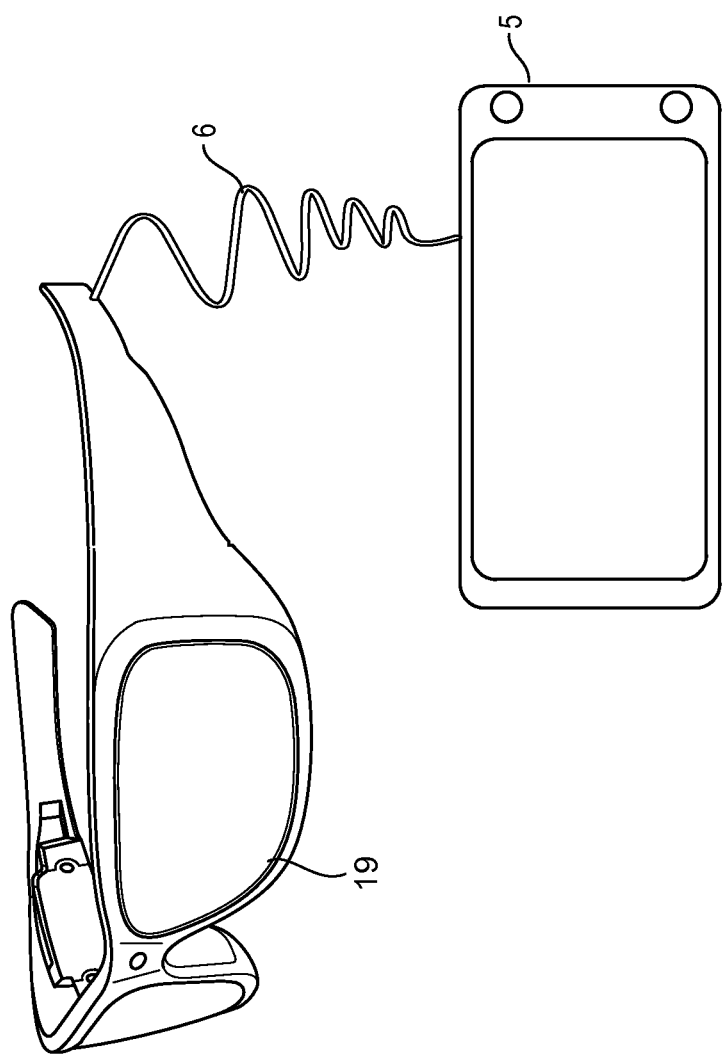
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5.

Figure 2B:
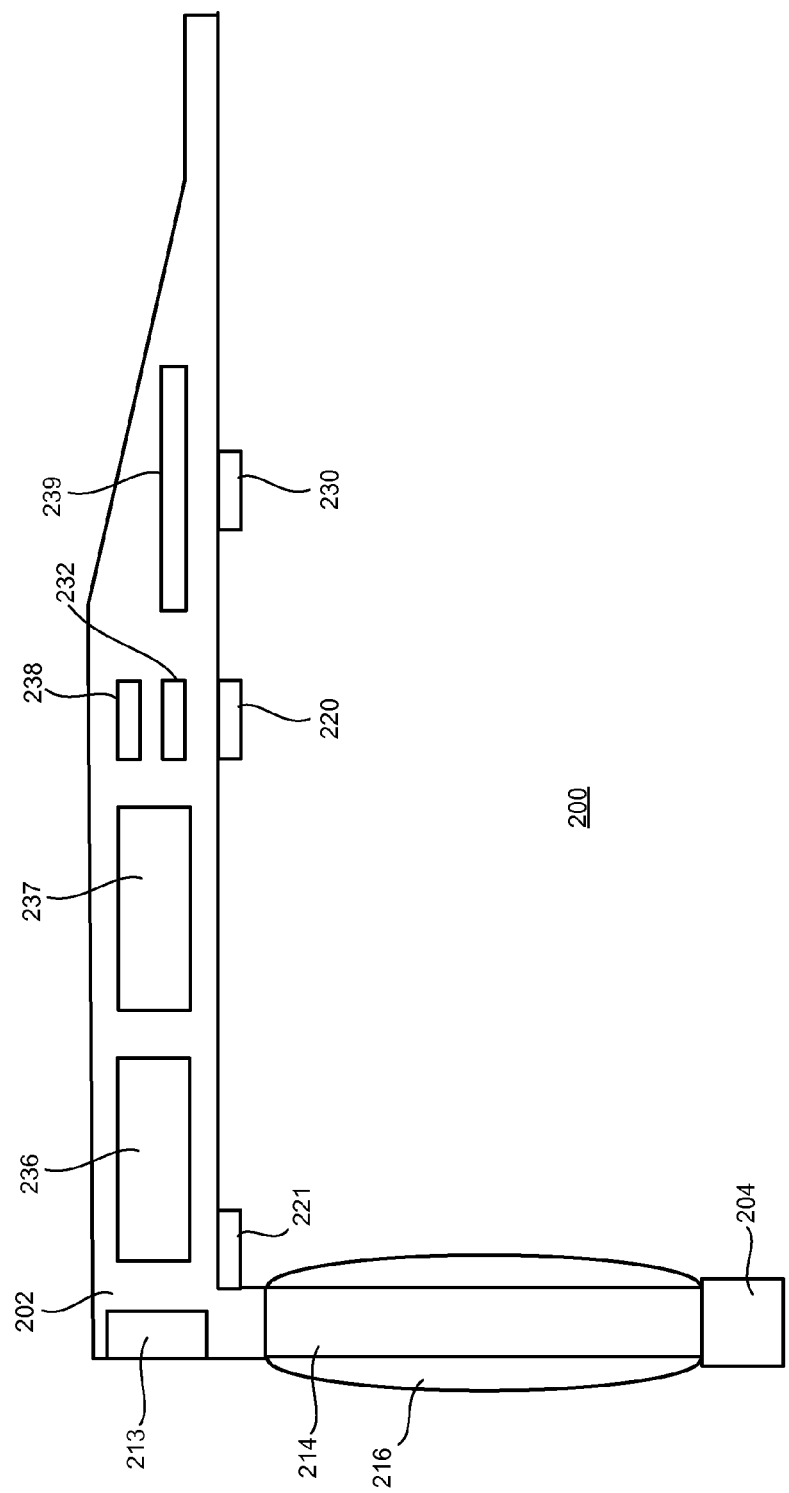
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The see-through display may display images of virtual objects by modulating light provided to the display, such as a liquid crystal on silicon (LCOS) display, or by generating light within the display, such as an OLED display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

In one embodiment, the processing unit 236 may include a core rendering pipeline (e.g., comprising one or more graphical processing units) for generating pre-rendered images and a display associated with eye glass 216 may perform late stage graphical adjustments to the pre-rendered images based on later stage pose information associated with the HMD 200. As updated pose information may be provided at a higher frequency than a maximum rendering frame rate for the core rendering pipeline, the late stage graphical adjustments may be applied to the pre-rendered images at a frequency that is greater than the maximum rendering frame rate.

Figure 3A:
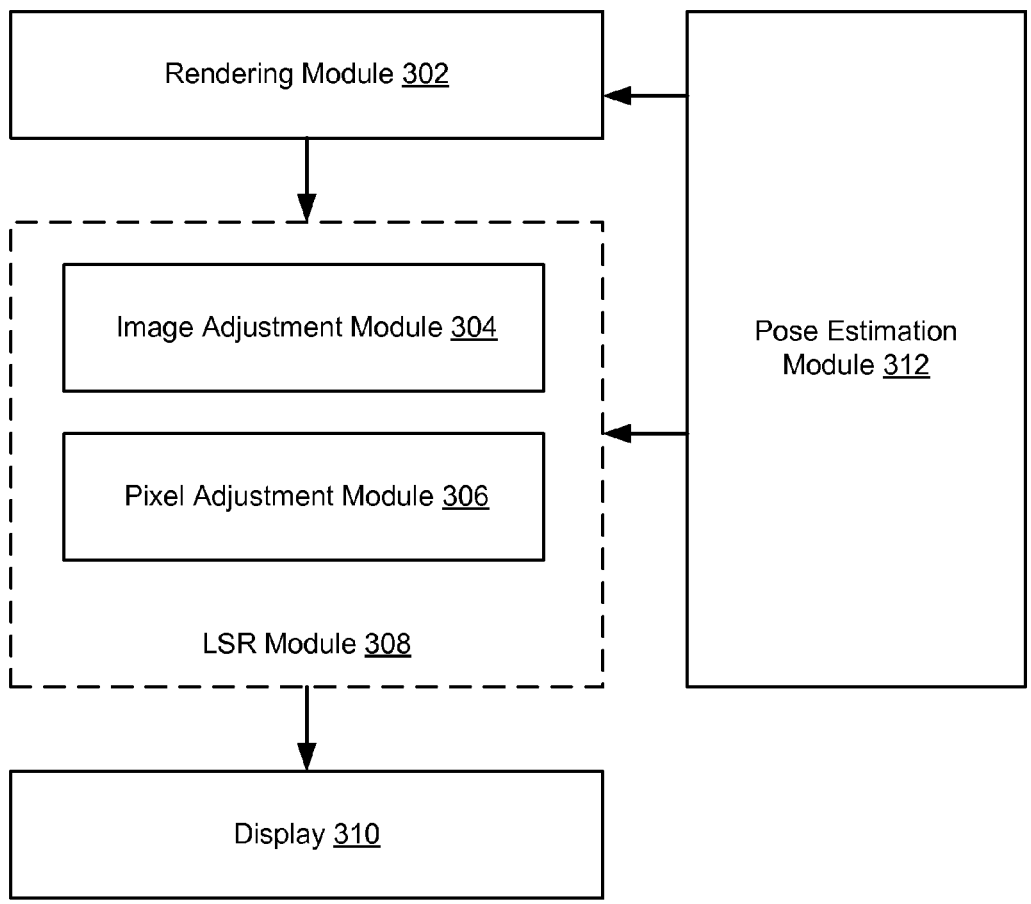
FIG. 3A depicts one embodiment of a system for generating and displaying images associated with a virtual object at a frame rate that is greater than a rendering frame rate for a core rendering pipeline.

FIG. 3A depicts one embodiment of a system for generating and displaying images associated with a virtual object (or more than one virtual object) at a frame rate that is greater than a rendering frame rate for a core rendering pipeline. As depicted, rendering module 302 may generate a pre-rendered image corresponding with a particular pose of an HMD. The particular pose may be provided to the rendering module 302 by pose estimation module 312. The pose estimation module 312 may predict a future pose of the HMD based on movement history of the HMD. In some embodiments, the pose estimation module 312 may predict more than one future pose of the HMD (e.g., three possible future poses for the HMD) and the rendering module 302 may generate a plurality of pre-rendered images corresponding with the more than one future poses. When updated pose information becomes available, the closest pose (i.e., the best predicted pose) of the more than one future poses and the corresponding pre-rendered images for the closest pose may be used for generating updated images by applying late stage graphical adjustments to the corresponding pre-rendered images for the closest pose. In one embodiment, when updated pose information becomes available, instead of a pre-rendered image associated with the closest pose of the more than one future poses being selected, the updated images may be generated using images that are extrapolated and/or interpolated from the plurality of pre-rendered images corresponding with the more than one future poses.

In some cases, the pose estimation module 312 may determine a current pose of the HMD based on camera-based pose tracking information and/or a combination of camera-based pose tracking information and low-latency IMU motion information. The pose estimation module 312 may predict a future pose of the HMD by extrapolating previous movement of the HMD (e.g., the movement of the HMD 5 ms or 10 ms prior to determining the current pose).

A late stage reprojection (LSR) module 308 may perform late stage graphical adjustments to pre-rendered images generated by the rendering module 302 based on updated pose estimation information provided by the pose estimation module 312. In one embodiment, the rendering module 302 may generate pre-rendered images every 16 ms or every 32 ms and the LSR module 308 may generate adjusted images every 2 ms or every 4 ms (i.e., the LSR module 308 may provide images to the display 310 at a frame rate that is greater than the maximum rendering frame rate of the rendering module 302). As depicted, the LSR module 308 includes an image adjustment module 304 and a pixel adjustment module 306. The image adjustment module 304 may generate adjusted images by applying homographic transformations to the pre-rendered images (e.g., applying a single plane homography or a multi-plane homography). In one example, the image adjustment module 304 may apply an affine transformation to a pre-rendered image. The pixel adjustment module 306 may perform a two-dimensional pixel shifting of an image. The image that is pixel shifted by the pixel adjustment module 306 may comprise a portion of a pre-rendered image or a portion of an image generated by the image adjustment module 304. In some cases, the LSR module 308 may generate an adjusted image by applying a homographic transformation to a pre-rendered image and then applying a pixel offset adjustment to the image generated via the homographic transformation. The adjusted images generated by the LSR module 308 may be displayed on display 310. In one embodiment, the display 310 may comprise an OLED display.

In some embodiments, portions of the LSR module 308 may be integrated with the display 310. In one example, the pixel adjustment module 306 may be performed using shift registers or other circuitry within the display 310 for allowing the shifting of pixel values within a pixel array of the display 310. In another example, both the image adjustment module 304 and the pixel adjustment module 306 may be performed by a controller or processor integrated with the display 310.

Figure 3B:
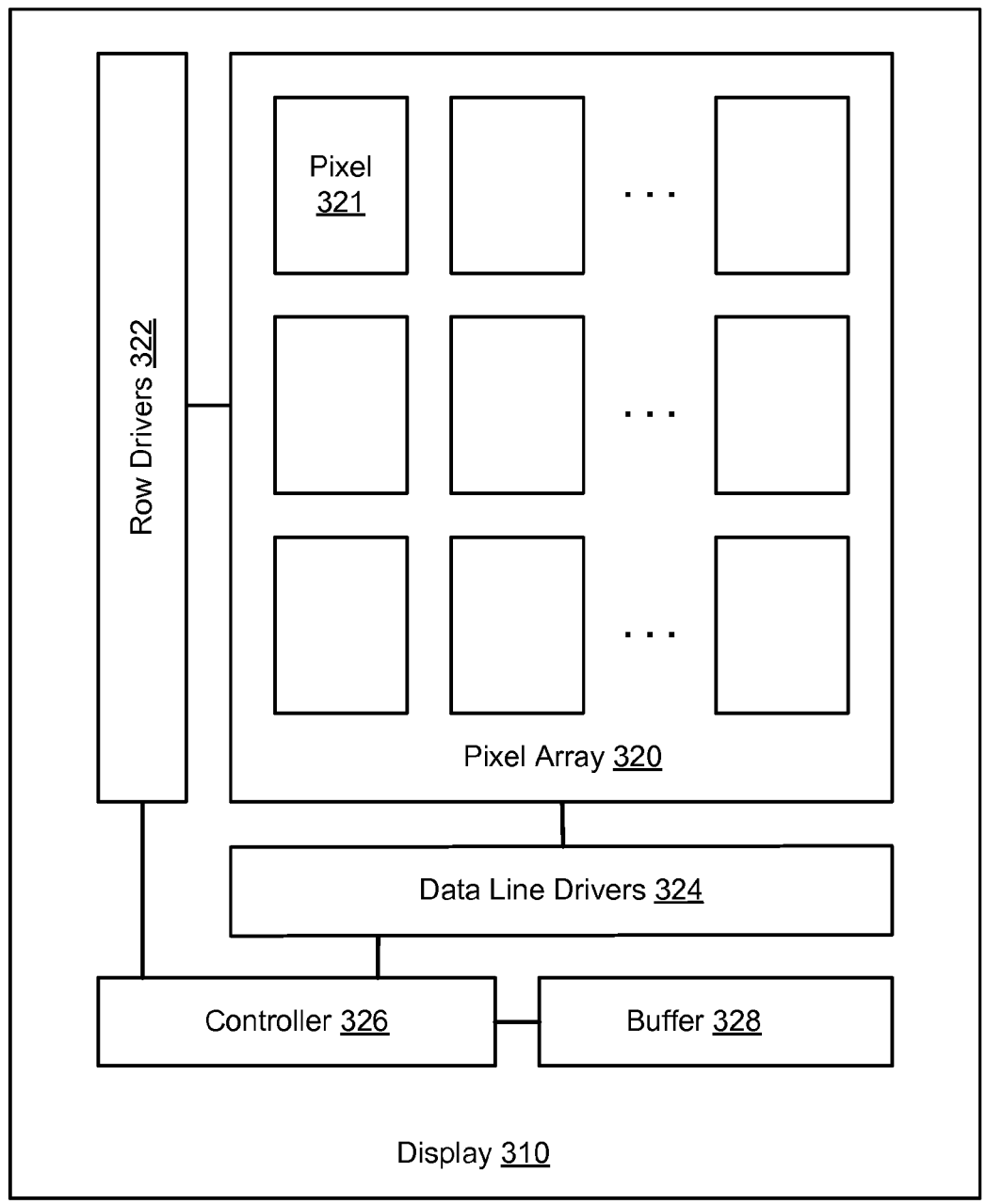
FIG. 3B depicts one embodiment of a display.

FIG. 3B depicts one embodiment of display 310 in FIG. 3A. As depicted, the display includes a pixel array 320 driven by row drivers 322 and data line drivers 224. The pixel array 320 comprises a plurality of pixels 321. In one embodiment, each pixel 321 may comprise an OLED pixel. Each OLED pixel may comprise an OLED and a group of circuits for controlling the OLED. The row drivers 322 may drive row lines (or scan lines) for selecting a particular row of pixels within the pixel array 320 and for connecting data lines corresponding with the data line drivers 324 to pixels in the particular row of pixels. Each row line associated with the row drivers 322 may connect to latching TFTs within each pixel of the particular row of pixels. A latching TFT may isolate a storage capacitor from a particular data line of the data lines (e.g., a particular column data line connected to each pixel in a column of the pixel array). The storage capacitor may be used to store a voltage for biasing a gate of a second TFT that drives an OLED. The controller 326 may load pixel values into the pixel array 320 by controlling the row drivers 322 and the data line drivers 324. The controller 326 may access buffered images stored in buffer 328 and perform image adjustments prior to loading pixel values into the pixel array 320.

In one embodiment, controller 326 may perform a particular homographic transformation to an image (or a portion of an image) stored in buffer 328 and then load the adjusted image into the pixel array 320 for display. The controller 326 may also perform a pixel offset adjustment to an image stored in buffer 328 (e.g., by shifting the pixel values of the image by a first pixel offset in the X-direction and a second pixel offset in the Y-direction).

Figure 3C:
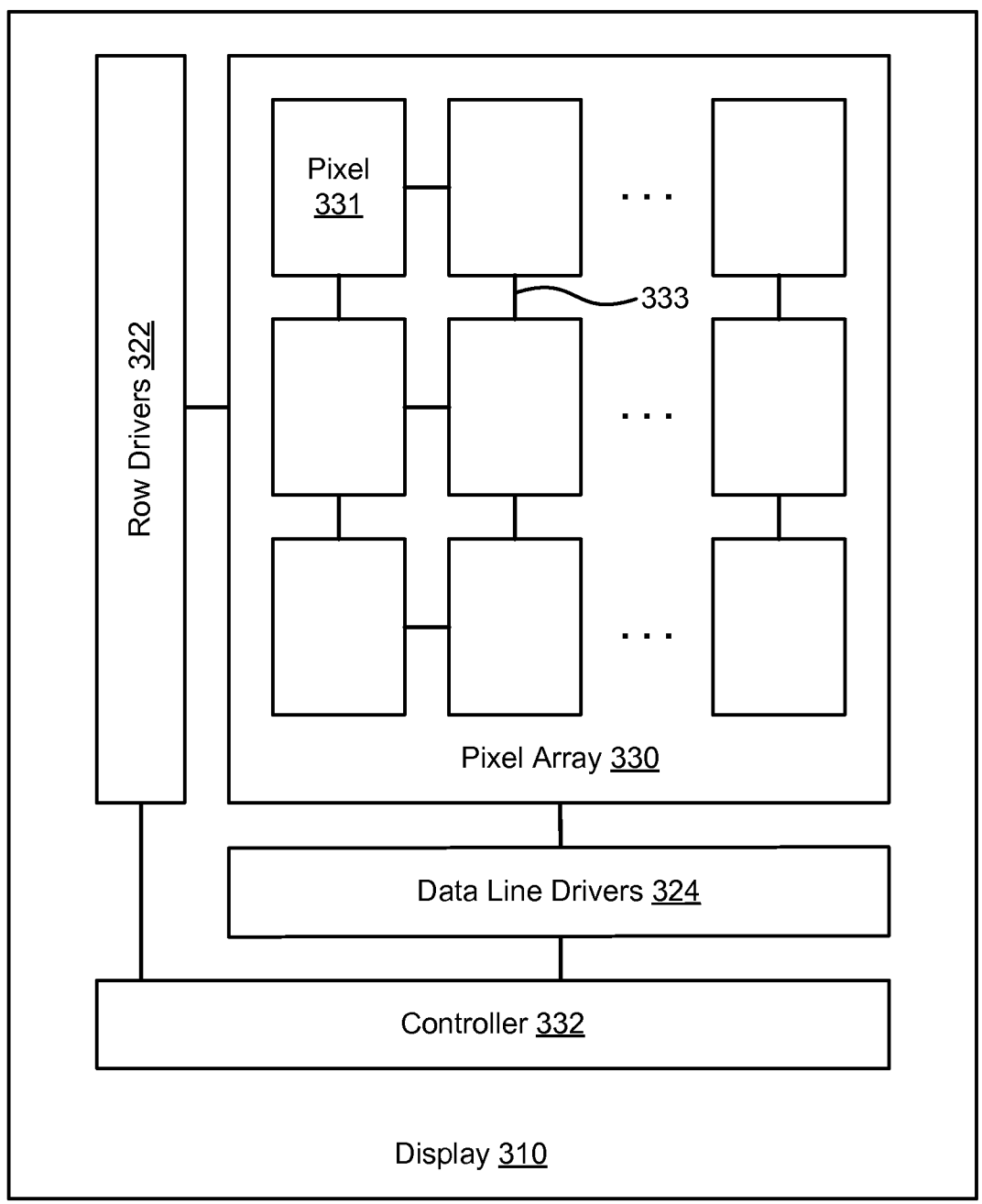
FIG. 3C depicts an alternative embodiment of a display.

FIG. 3C depicts an alternative embodiment of display 310 in FIG. 3A. As depicted, the display includes a pixel array 330 driven by row drivers 322 and data line drivers 224. The pixel array 330 comprises a plurality of pixels 331. In one embodiment, each pixel 331 may comprise an OLED pixel. Each OLED pixel may comprise an OLED, a first group of circuits for controlling the OLED, and a second group of circuits for performing pixel shifting within the pixel array 330. The pixel array 330 may include pixel interconnections 333 between adjacent pixels for facilitating the shifting of pixel values within the pixel array. In one embodiment, latched data values may be shifted vertically (i.e., in the column direction) and/or horizontally (i.e., in the row direction) between adjacent pixels. In another embodiment, data values stored on a storage capacitor for a particular pixel may be used to drive one of a plurality OLEDs within the pixel array 330 (i.e., rather than physically shifting the latched data value, a multiplexor within each pixel may be used to select the correct latched data value to apply to its corresponding OLED).

The row drivers 322 may drive row lines (or scan lines) for selecting a particular row of pixels within the pixel array 330 and for connecting data lines corresponding with the data line drivers 324 to pixels in the particular row of pixels. Each row line associated with the row drivers 322 may connect to latching TFTs within each pixel of the particular row of pixels. A latching TFT may isolate a storage capacitor from a particular data line of the data lines (e.g., a particular column data line connected to pixels in a column of the pixel array). The storage capacitor may be used to store a voltage for biasing a second TFT that drives an OLED (e.g., for controlling the gate of the second TFT). In one embodiment, each pixel 331 may include a multiplexor for selecting one of a plurality of latched data values (each stored on a storage capacitor within the pixel array) for driving a TFT that drives the OLED for the pixel. In some cases, the multiplexor may allow for the shifting of displayed pixel values within the pixel array 330 by a first pixel offset in the X-direction and a second pixel offset in the Y-direction. The controller 332 may load pixel values into the pixel array 330 by controlling the row drivers 322 and the data line drivers 324. The controller 332 may perform image adjustments prior to loading pixel values into the pixel array 330. The controller 332 may include a memory buffer for buffering image information provided to the display 310.

In one embodiment, controller 332 may perform a particular homographic transformation to an image then load pixel values associated with the image into the pixel array 330. The controller may subsequently perform a pixel offset adjustment by shifting the pixel values within the pixel array 331. In one example, latched data values within each pixel may be physically shifted vertically (i.e., in the column direction) and/or horizontally (i.e., in the row direction) within the pixel array via pixel interconnections 333. In another example, latched data values may be used to drive one of a plurality OLEDs within the pixel array 330 by incorporating a multiplexor within each pixel 331 of the pixel array 330. In some cases, the pixel array 330 may utilize a CMOS backplane. In other cases, the pixel array 330 may utilize a CCD backplane.

Figure 4A:
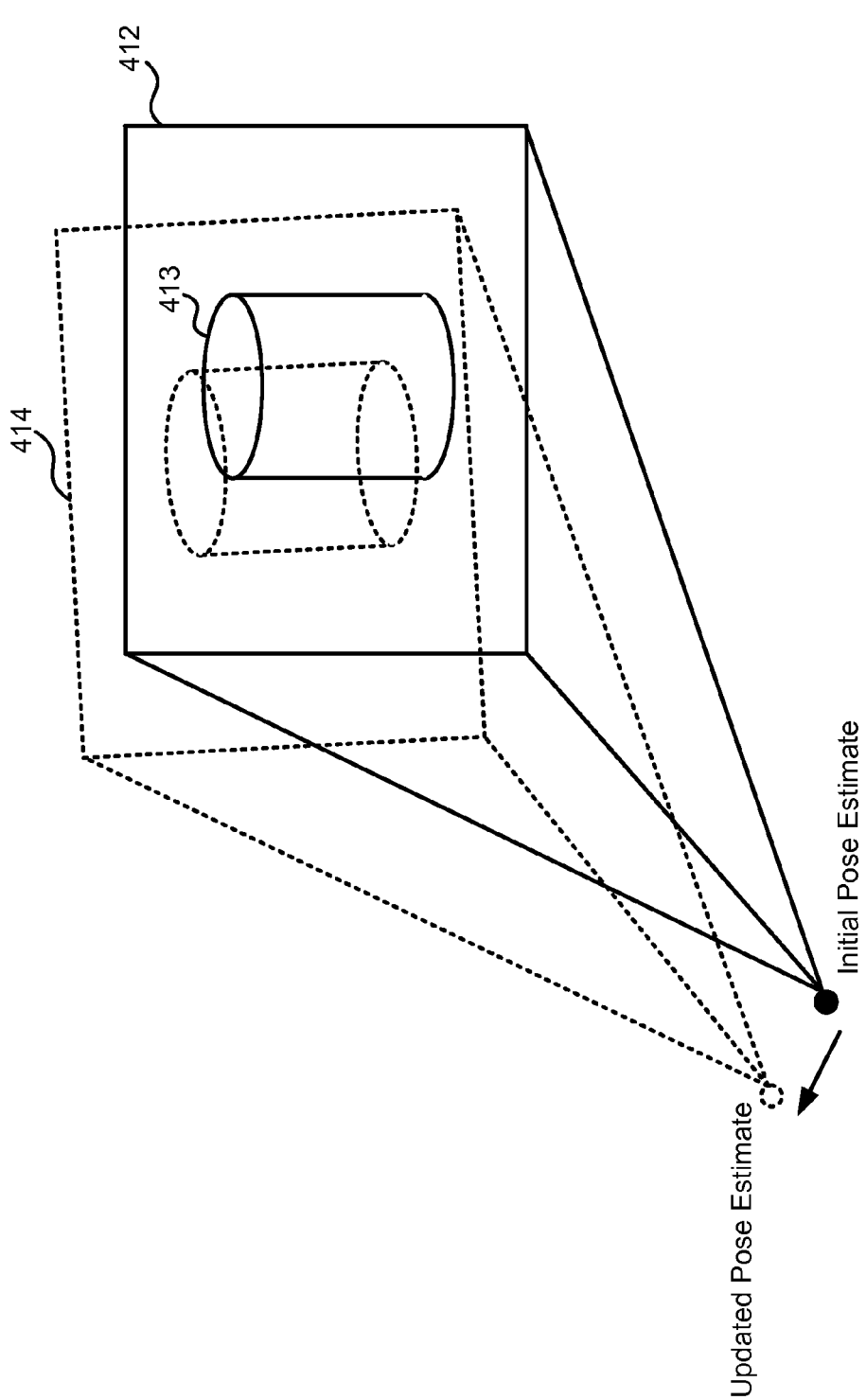
FIG. 4A depicts one embodiment of a portion of a pre-rendered image and an updated image based on the pre-rendered image.

FIG. 4A depicts one embodiment of a portion of a pre-rendered image 412 and an updated image 414 based on the pre-rendered image 412. As depicted, the pre-rendered image 412 may be rendered based on an initial pose estimate for an HMD (e.g., a predicted pose of the HMD 8 ms or 16 ms into the future). The initial pose estimate may be determined based on a current position and orientation of the HMD and an acceleration and a velocity of the HMD immediately prior to determining the initial pose estimate. The pre-rendered image 412 may comprise a rendered image based on the initial pose estimate and may be rendered using a GPU or other rendering system that has the ability to render a three-dimensional scene into a two-dimensional image given a particular pose. The updated pose estimate may be determined based on updated pose information that is acquired at a point in time subsequent to the determination of the initial pose estimate. In one example, the updated pose information may be generated based on camera-based pose tracking information and/or a combination of camera-based pose tracking information and low-latency IMU motion information corresponding with the HMD.

In some embodiments, the updated image 414 may be generated by applying an image transformation to the pre-rendered image 412 based on a pose difference between the updated pose estimate and the initial pose estimate. In one example, the image transformation may comprise an image rotation, translation, resizing (e.g., stretching or shrinking), shifting, or tilting of at least a portion of the pre-rendered image 412. The updated image 414 may be generated via a homographic transformation of the pre-rendered image 412. In some cases, the homographic transformation may comprise a multi-plane homography, a single plane homography, and/or an affine homography.

In some embodiments, the updated image 414 may be generated by applying a pixel offset adjustment to the pre-rendered image 402. The degree of the pixel offset adjustment may depend on a difference between the updated pose estimate and the initial pose estimate. As depicted, an image 413 of a virtual object (i.e., a virtual cylinder) has been pixel shifted in both the X-dimension and the Y-dimension (e.g., by 4 pixels to the left and by 3 pixels up). In one embodiment, the updated image 414 may be generated using a pixel offset adjustment or a combination of homographic transformations and pixel offset adjustments. The homographic transformations and/or pixel offset adjustments may be generated using a controller or processor integrated with a display. In some cases, the pixel offset adjustments may be performed using a display that incorporates shift registers or other circuitry for allowing the shifting of pixel values within a pixel array of the display.

Figure 4B:
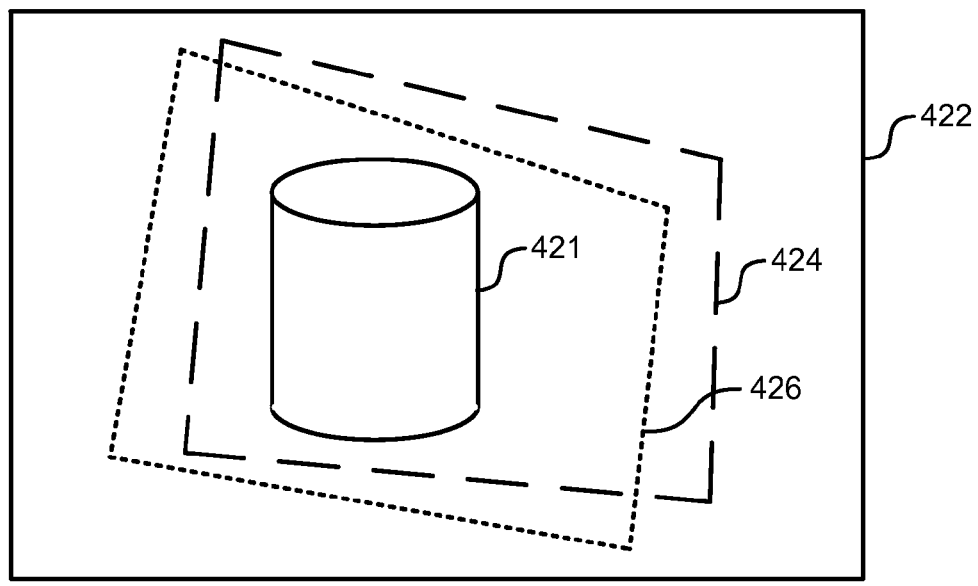
FIG. 4B depicts one embodiment of a pre-rendered image and sampling regions used for generating updated images (or target images).

FIG. 4B depicts one embodiment of a pre-rendered image 422 and sampling regions 424 and 426 used for generating updated images (or target images) based on portions of the pre-rendered image 422. As depicted, pre-rendered image 422 includes an image of a virtual object 421 (i.e., a virtual cylinder). In one embodiment, the sampling region 424 may correspond with a first homographic transformation for generating a first updated image and the sampling region 426 may correspond with a second homographic transformation for generating a second updated image. A homographic transformation may comprise a weighted mapping between pixels (or points) within the pre-rendered image (i.e., the source image or source frame) and points within an updated image (i.e., the target image or target frame). The four corners of a sampling region may correspond with the four corners of a corresponding updated image. In one embodiment, the quadrilateral region associated with sampling region 424 (i.e., a first subset of points within the source image) may be mapped to a second quadrilateral region associated with an updated image (i.e., a second subset of points within the target image). In some cases, the sampling region 424 may derive from a portion of an image within a frame buffer of a core rendering pipeline or rendering GPU. In the case of affine homography, points within a first parallelogram region within a source image may be mapped to points within a second parallelogram region within a target image (or to the entire target image comprising a rectangular region).

As depicted, a source image may be larger than a corresponding target image. The source image may be overrendered to account for potential head movements beyond a current point of view or pose. In one example, the source image may comprise an image that is 1920 pixels by 1080 pixels and the target image may comprise an image that is 1366 pixels by 768 pixels. Assuming a one to one mapping, the sampling regions 424 and 426 may both comprise images that are 1366 pixels by 768 pixels. In some embodiments, each pixel within the target image may correspond with a weighted mapping of four or more pixels within the source image. The mapping of source pixels from a sampling region of the source image into target pixels of a target image may include bilinear filtering (or other texture filtering) of the source pixels. In some cases, a distortion correction mapping may be applied to the source image prior to applying a homographic transformation.

In one embodiment, the sampling region 424 (and first homographic transformation) may be associated with a first pose (or a first predicted pose) of an HMD at a first point in time and the sampling region 426 (and second homographic transformation) may be associated with a second pose (or a second predicted pose) of the HMD at a second point in time subsequent to the first point in time (e.g., 2 ms or 4 ms after the first point in time). In one example, the first predicted pose may correspond with a predicted pose that is 4 ms into the future and the second predicted pose may correspond with a predicted pose that is 8 ms into the future. A first updated image corresponding with the first homographic transformation may be displayed prior to a second updated image corresponding with the second homographic transformation being display. The first updated image may be displayed while the second updated image is being generated.

In one embodiment, the sampling region 424 in FIG. 4B may correspond with a first homographic transformation for generating a first portion of a target image (e.g., a top portion of the target image) and the sampling region 426 in FIG. 4B may correspond with a second homographic transformation for generating a second portion of the target image (e.g., a bottom portion of the target image).

Figure 4C:
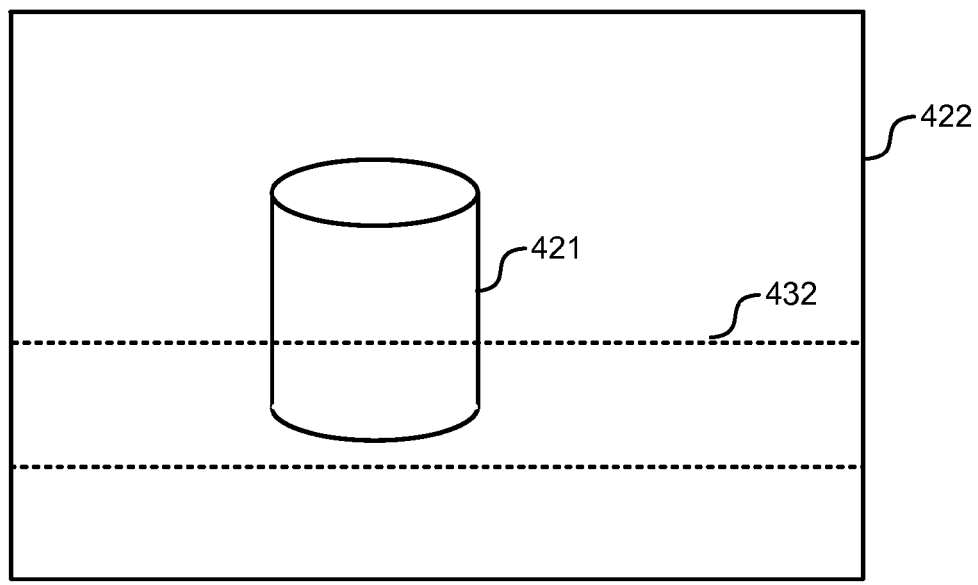
FIG. 4C depicts one embodiment of the a pre-rendered image and the application of a rolling buffer to the pre-rendered image.

FIG. 4C depicts one embodiment of the pre-rendered image 422 of FIG. 4B wherein a rolling buffer 432 (e.g., spanning a particular number of rows or scan lines) is applied to the pre-rendered image 422. In some cases, the pre-rendered image 422 may comprise a plurality of segments (e.g., each spanning 10 rows) and the rolling buffer 432 may correspond with one of the plurality of segments at a particular point in time (e.g., the rolling buffer 432 may move between each of the plurality of segments in a top to bottom sequence). The rolling buffer 432 may determine the source pixels within the pre-rendered image 422 that may be operated on at a particular point in time. In some cases, a homographic transformation may apply to a subset of the source pixels within the rolling buffer 432 (e.g., corresponding with the overlap of the sampling region 424 of FIG. 4B and the source image rows pointed to by the rolling buffer 432).

The concept of applying a rolling buffer to a source image may also be applied to the target image. In some embodiments, a homographic transformation may correspond with a subset of target pixels within the target image. For example, a rolling buffer may be applied to the target image such that a homography (or other image transformation) is applied to the subset of target pixels. The subset of target pixels may correspond with a set of scan lines within the target image (e.g., the subset of target pixels comprises pixels spanning 20 rows of the target image). In this case of a scanning display, image reprojection techniques may be applied to pixels that will be updated within a particular time period (e.g., a homographic transformation need only apply to those pixels within the target image that will be displayed or updated within the next 2 ms).

Figure 5A:
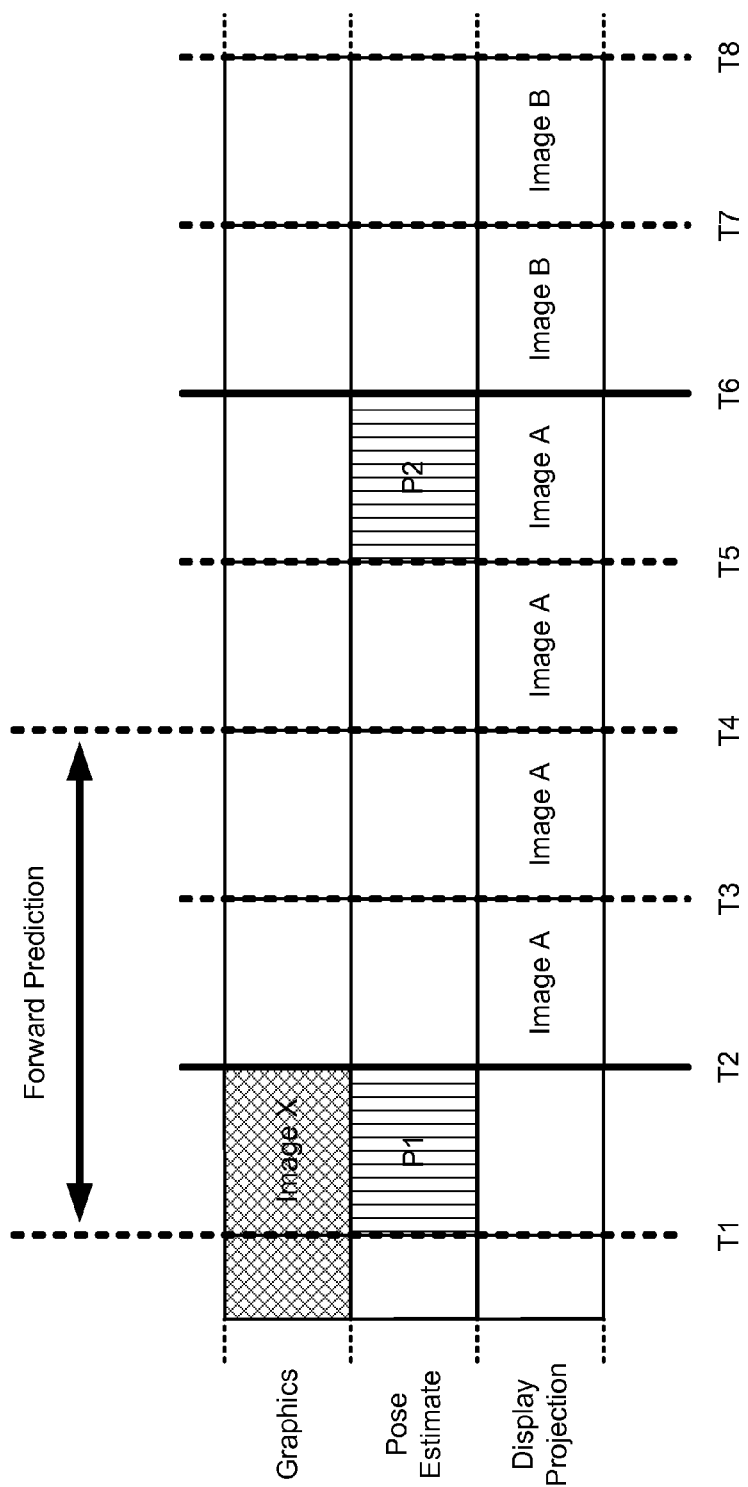
FIG. 5A depicts one embodiment of applying late stage graphical adjustments to a rendered image in order to generate updated images.

FIG. 5A depicts one embodiment of applying late stage graphical adjustments to a rendered image in order to generate updated images. The updated image may be displayed using an HMD. As depicted, a rendered image (Image X) is available by time T2. The overall time for rendering the rendered image may be, for example, 16 ms, 30 ms, or 60 ms depending on the core rendering pipeline for generated the rendered image. Prior to the rendered image becoming available at time T2, a pose estimate (P1) may be initiated at time T1 and used to generate an updated image (Image A) by time T2 based on the rendered image. The updated image (Image A) may be displayed between times T2 and T6 using a display of the HMD. In one embodiment, the pose estimate (P1) may correspond with a predicted pose of an HMD at time T4 (or another point in time during which an image is projected using the HMD). In some embodiments, the time for the predicted pose may correspond with a middle display time for the display of the updated image (Image A) derived from the rendered image (Image X). The middle display time for the display of the updated image may correspond with the center photon of the projection or the midpoint of the projection time. At time T5, a second pose estimate (P2) may be initiated and used to generate a second updated image (Image B) by time T6. The second updated image (Image B) may be displayed beginning at time T6.

In one example, a display may display updated images every 4 ms (i.e., the time between T2 and T6 may be 4 ms). Prior to the rendered image (Image X) becoming available, a predicted pose corresponding with a middle display time for an updated image may be determined. As the predicted pose is initiated at time T1 and the updated image will be displayed for 4 ms, the predicted pose may correspond with a predicted pose 3 ms into the future from time T1. One reason for forward predicting to the middle display time is that error due to display latency may be minimized or centered around the middle display time.

In one embodiment, a display may comprise a field-sequential color display and the updated image (Image A) may correspond with a first color field (e.g., a red image) and the second updated image (Image B) may correspond with a second color field (e.g., a green image). In this case, the pose estimate (P1) may be used for generating the updated image (Image A) associated with the first color field and the second pose estimate (P2) may be used for generating the second updated image (Image B) associated with the second color field. In some cases, the updated image (Image A) may be generated using a pixel offset adjustment of the rendered image (Image X) and the second updated image (Image B) may be generated using a homographic transformation of the rendered image (Image X) and/or a second pixel offset adjustment of the rendered image (Image X). The field-sequential color display may comprise, for example, an OLED display or an LCOS display.

In one embodiment, a display may comprise a LCOS display that is driven in a unipolar fashion, wherein a driving voltage may be reversed during image projection to prevent liquid crystal degradation. As each color field projection may correspond with both a positive projection (e.g., the first 2 ms of an image projection) and a negative projection (e.g., the last 2 ms of the image projection), a first updated image may be projected during the positive projection and a second updated image may be projected during the negative projection, thereby effectively doubling the display frame rate. In some cases, the first updated image may be generated via a first pixel offset adjustment by circuitry integrated with the LCOS display and the second updated image may be generated via a second pixel offset adjustment by circuitry integrated with the LCOS display.

Figure 5B:
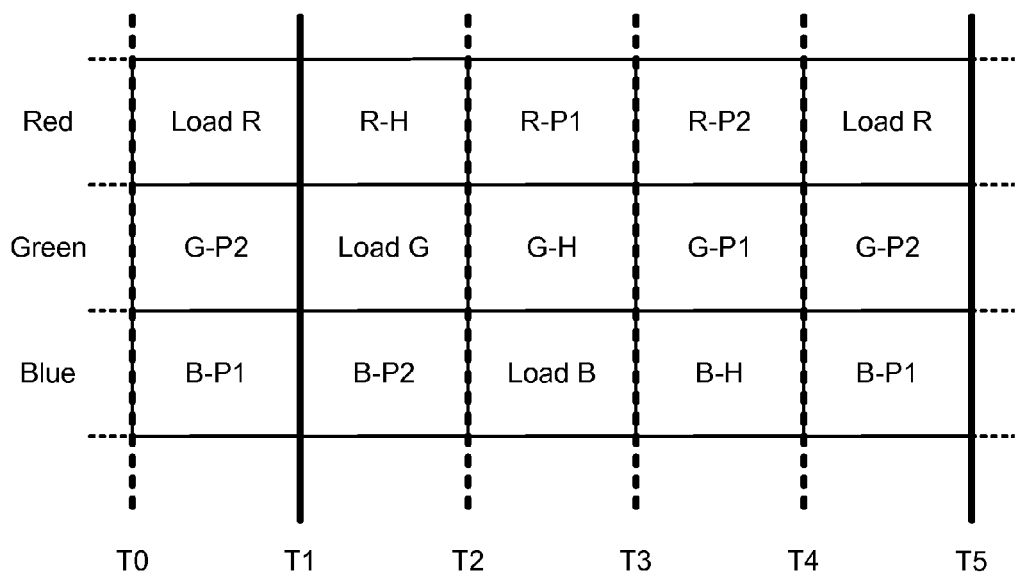
FIG. 5B depicts one embodiment of a display sequence associated with a display.

FIG. 5B depicts one embodiment of a display sequence associated with a display. The display sequence may correspond with a field-sequential color display or a non-field-sequential color display. In one embodiment, images associated with each color field of the red, green, and blue color fields may be loaded into the display at different points in time. For example, a first image (Load R) associated with the red color field may be loaded into the display between times T0 and T1, a second image (Load G) associated with the green color field may be loaded into the display between times T1 and T2, and a third image (Load B) associated with the blue color field may be loaded into the display between times T2 and T3. As the second image (Load G) is being loaded into the display, a red-homographic image (R-H) corresponding with a homographic transformation of the first image and a blue-pixel-adjusted image (B-P2) corresponding with a second pixel offset adjustment of a previously loaded blue image may be displayed on the display. As the third image (Load B) is being loaded into the display, a green-homographic image (G-H) corresponding with a homographic transformation of the second image and a red-pixel-adjusted image (R-P1) corresponding with a first pixel offset adjustment of the red-homographic image (R-H) may be displayed on the display. Between times T3 and T4, a blue-homographic image (B-H) corresponding with a homographic transformation of the third image may be displayed while a red-pixel-adjusted image (R-P2) corresponding with a second pixel offset adjustment of the red-homographic image (R-H) and a green-pixel-adjusted image (G-P1) corresponding with a first pixel offset adjustment of the green-homographic image (G-H) are displayed. Between times T4 and T5, as the next red color field image is being loaded into the display, a green-pixel-adjusted image (G-P2) corresponding with a second pixel offset adjustment of the green-homographic image (G-H) and a blue-pixel-adjusted image (B-P1) corresponding with a first pixel offset adjustment of the blue-homographic image (B-H) are displayed. In some cases, the display may comprise an OLED display and the time between times T1 and T5 may comprise roughly 8 ms.

In one embodiment, the homographic transformations to the loaded color images and any pixel offset adjustments to displayed images may be performed by circuitry within the display. In another embodiment, the homographic transformations to the color images and any pixel offset adjustments to displayed images may be performed by a host device and transmitted to the display.

Figure 5C:
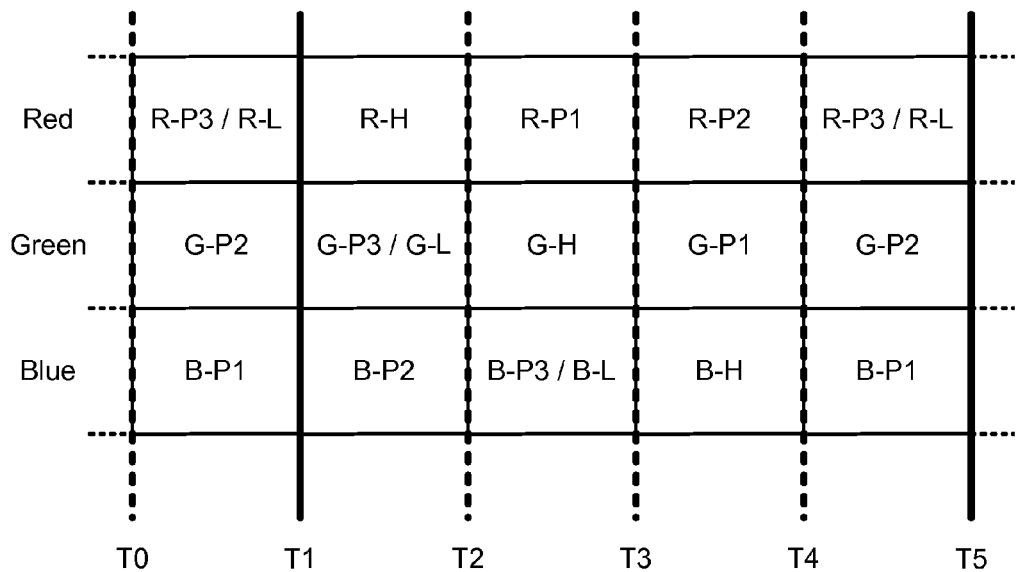
FIG. 5C depicts an alternative embodiment of a display sequence associated with a display.

FIG. 5C depicts an alternative embodiment of a display sequence associated with a display. The display sequence may correspond with a field-sequential color display or a non-field-sequential color display. In one embodiment, images associated with each color field of the red, green, and blue color fields may be loaded into the display at different points in time. For example, a first image (R-L) associated with the red color field may be loaded into the display between times T0 and T1, a second image (G-L) associated with the green color field may be loaded into the display between times T1 and T2, and a third image (B-L) associated with the blue color field may be loaded into the display between times T2 and T3. As the second image (G-L) is being loaded into the display, a red-homographic image (R-H) corresponding with a homographic transformation of the first image, a blue-pixel-adjusted image (B-P2) corresponding with a second pixel offset adjustment of a previously loaded blue image, and a green-pixel-adjusted image (G-P3) corresponding with a third pixel offset adjustment of a previously loaded green image may be displayed on the display (i.e., the G-P3 image may be displayed while the G-L image is loaded into the display). As the third image (B-L) is being loaded into the display, a green-homographic image (G-H) corresponding with a homographic transformation of the second image, a red-pixel-adjusted image (R-P1) corresponding with a first pixel offset adjustment of the red-homographic image (R-H), and a blue-pixel-adjusted image (B-P3) corresponding with a third pixel offset adjustment of a previously loaded blue image may be displayed on the display (i.e., the B-P3 image may be displayed while the B-L image is loaded into the display). Between times T3 and T4, a blue-homographic image (B-H) corresponding with a homographic transformation of the third image may be displayed while a red-pixel-adjusted image (R-P2) corresponding with a second pixel offset adjustment of the red-homographic image (R-H) and a green-pixel-adjusted image (G-P1) corresponding with a first pixel offset adjustment of the green-homographic image (G-H) are displayed. Between times T4 and T5, as the next red color field image is being loaded into the display, a green-pixel-adjusted image (G-P2) corresponding with a second pixel offset adjustment of the green-homographic image (G-H), a blue-pixel-adjusted image (B-P1) corresponding with a first pixel offset adjustment of the blue-homographic image (B-H), and a red-pixel-adjusted image (R-P3) corresponding with a third pixel offset adjustment of a previously loaded red image may be displayed on the display (i.e., the R-P3 image may be displayed while the next red image is loaded into the display). In some cases, the display may comprise an OLED display with an image buffer for allowing new images to be loaded while displaying other images and the time between times T1 and T5 may comprise roughly 8 ms.

In one embodiment, the homographic transformations to the loaded color images and any pixel offset adjustments to displayed images may be performed by circuitry within the display. In another embodiment, the homographic transformations to the color images and any pixel offset adjustments to displayed images may be performed by a host device and transmitted to the display.

Figure 6A:
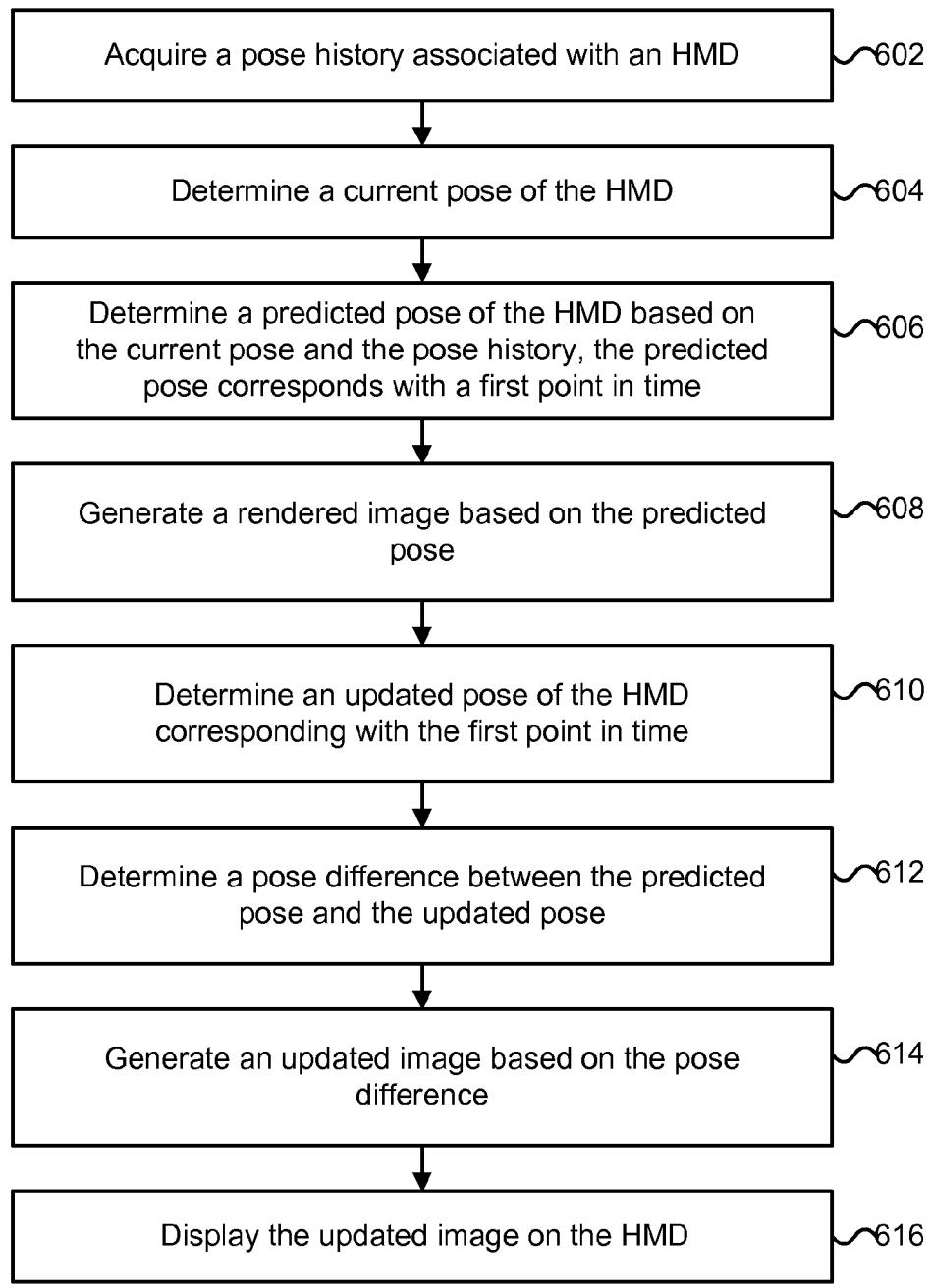
FIG. 6A is a flowchart describing one embodiment of a method for generating and displaying images associated with virtual objects at a frame rate that is greater than a rendering frame rate.

FIG. 6A is a flowchart describing one embodiment of a method for generating and displaying images associated with virtual objects at a frame rate that is greater than a rendering frame rate. In one embodiment, the process of FIG. 6A may be performed by an HMD, such as mobile device 19 in FIG. 1.

In step 602, a pose history associated with an HMD is acquired. The pose history may comprise positions, orientations, and movements of the HMD overtime. In step 604, a current pose of the HMD is determined. The current pose may be determined using camera-based pose tracking. In step 606, a predicted pose of the HMD is determined based on the current pose and the pose history. The predicted pose may correspond with a first point in time (e.g., 8 ms or 16 ms in the future from when the current pose was determined).

In step 608, a rendered image is generated based on the predicted pose. The rendered image may be rendered using a GPU or other rendering system that has the ability to render a three-dimensional scene into a two-dimensional image given the predicted pose. In step 610, an updated pose of the HMD is determined corresponding with the first point in time. The updated pose may be determined using camera-based pose tracking information and/or a combination of camera-based pose tracking information and low-latency IMU motion information.

In step 612, a pose difference between the predicted pose and the updated pose is determined. The pose difference may determine a degree of graphical adjustment to be applied to a portion of the rendered image in order to compensate for an incorrect pose prediction when generating the rendered image.

In step 614, an updated image is generated based on the pose difference. The updated image may be generated via a homographic transformation of a portion of the rendered image. In some cases, the homographic transformation may comprise an affine transformation. The updated image may also be generated using a pixel offset adjustment or a combination of homographic transformations and pixel offset adjustments. In some cases, the homographic transformations and/or pixel offset adjustments may be generated using a controller or processor integrated with a display of the HMD. In one embodiment, the pixel offset adjustments may be performed using a display of the HMD that incorporates shift registers or other circuitry for allowing the shifting of pixel values within a pixel array of the display. In step 616, the updated image is displayed on the HMD. The updated image may be displayed using an OLED display integrated with the HMD.

Figure 6B:
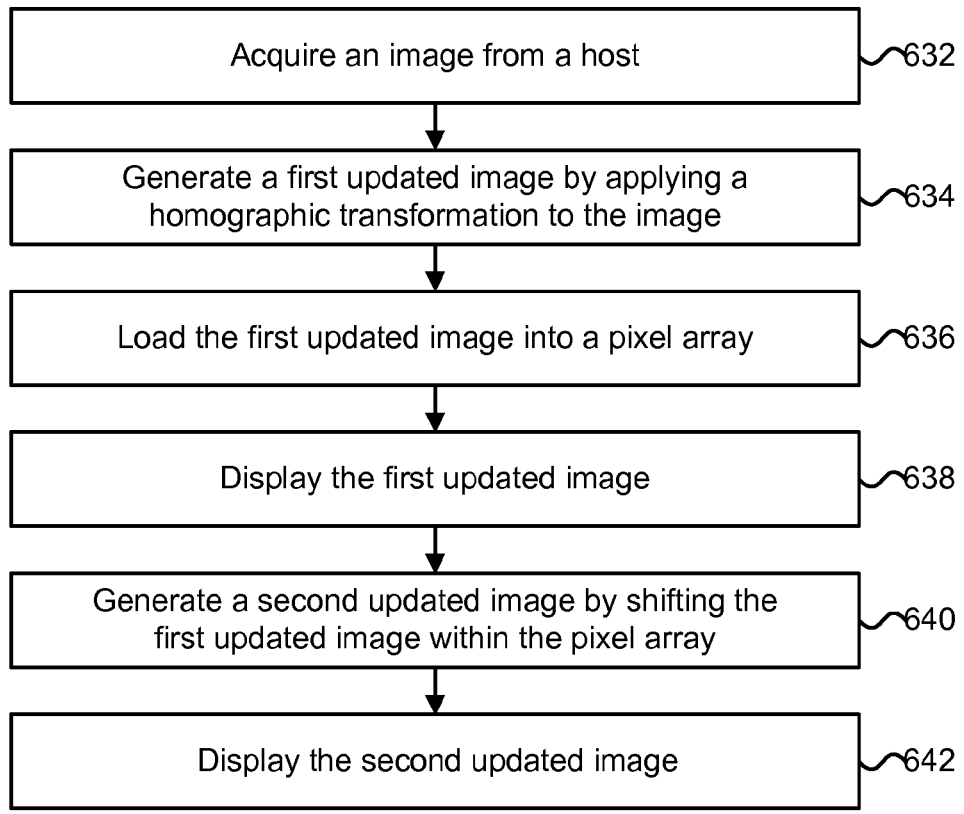
FIG. 6B is a flowchart describing one embodiment of a method for making graphical adjustments to rendered images provided to a display using circuitry integrated with the display.

FIG. 6B is a flowchart describing one embodiment of a method for making graphical adjustments to rendered images provided to a display using circuitry integrated with the display. In one embodiment, the process of FIG. 6B may be performed by a display, such as display 150 in FIG. 1.

In step 632, an image is acquired from a host. The host may comprise a core rendering pipeline for generating images of virtual objects. In step 634, a first updated image is generated by applying a homographic transformation to the image. The homographic transformation may comprise an affine transformation. In step 636, the first updated image is loaded into a pixel array of a display. The display may comprise an OLED display. In step 638, the first updated image may be displayed using the display.

In step 640, a second updated image may be generated by shifting the first updated image within the pixel array. In one embodiment, latched data values within the pixel array may be shifted vertically (i.e., in the column direction) and/or horizontally (i.e., in the row direction) between adjacent pixels. In another embodiment, data values stored within the pixel array may drive one of a plurality LEDs within the pixel array (i.e., rather than physically shifting the latched data value, a multiplexor within each pixel may be used to select the correct latched data value to apply to its corresponding LED). In step 642, the second updated image is displayed on the display.

Figure 7A:
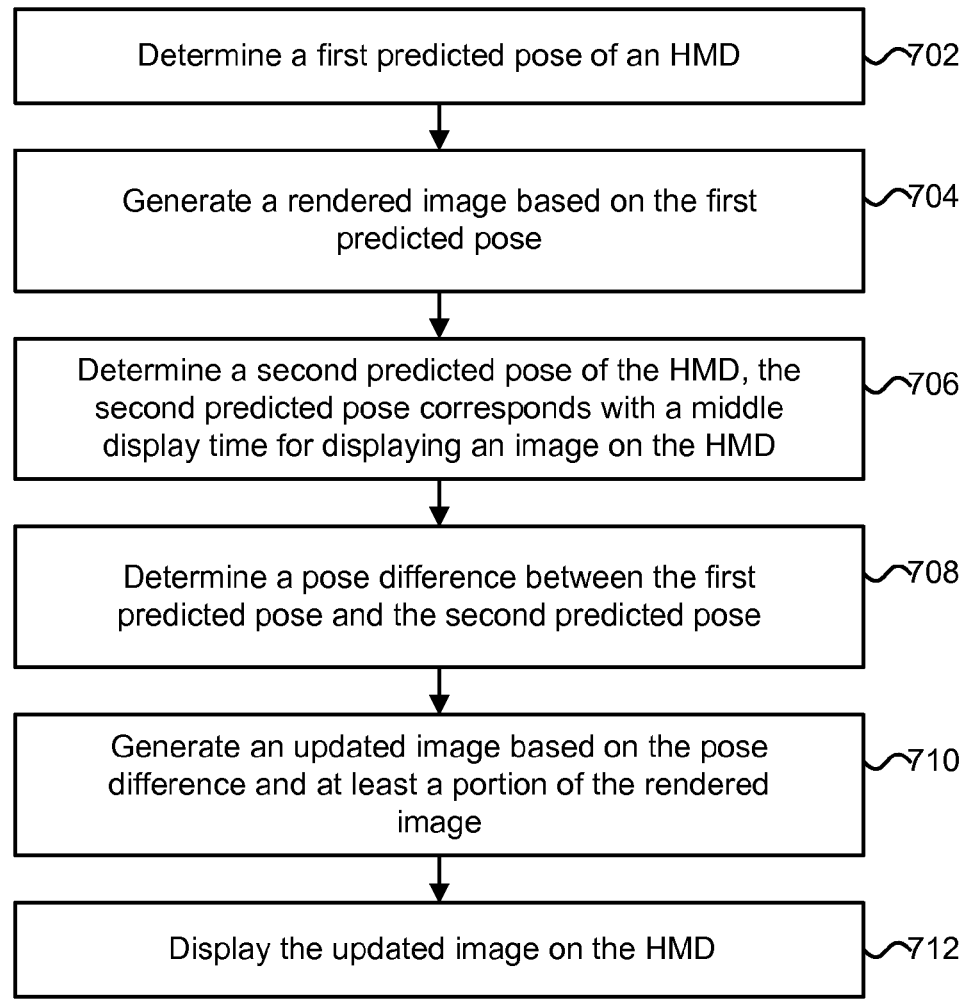
FIG. 7A is a flowchart describing an alternative embodiment of a method for generating and displaying images associated with virtual objects at a frame rate that is greater than a rendering frame rate.

FIG. 7A is a flowchart describing an alternative embodiment of a method for generating and displaying images associated with virtual objects at a frame rate that is greater than a rendering frame rate. In one embodiment, the process of FIG. 7A may be performed by an HMD, such as mobile device 19 in FIG. 1.

In step 702, a first predicted pose associated with an HMD is determined. The first predicted pose of the HMD may be determined based on a pose history of the HMD and may correspond with a future point in time during which an image based on the first predicted pose may be displayed or projected using a display of the HMD. In step 704, a rendered image is generated based on the first predicted pose. The rendered image may be rendered using a GPU or other rendering system that has the ability to render a three-dimensional scene into a two-dimensional image given the first predicted pose. In some cases, the rendering system may take 30 ms or 60 ms to render the rendered image. Each rendered image generated by the rendering system may be associated with metadata identifying a particular pose from which the rendered image was generated. One embodiment of a process for generating a rendered image is described later in reference to FIG. 7B.

In step 706, a second predicted pose of the HMD is determined. The second predicted pose may comprise an updated pose (e.g., an updated pose estimate based on updated position and motion information of the HMD not available prior to determining the first predicted pose). In some cases, the second predicted pose may be determined by extrapolating camera-based pose tracking information and/or a combination of camera-based pose tracking information and low-latency IMU motion information.

In some embodiments, the second predicted pose may correspond with a middle display time for the display of an updated image derived from the rendered image. The middle display time of an updated image may correspond with the center photon of the projection of the updated image or the midpoint of the projection time of the updated image.

In step 708, a pose difference between the first predicted pose and the second predicted pose is determined. The pose difference may determine a degree of graphical adjustment to be applied to a portion of the rendered image in order to compensate for an incorrect pose prediction when generating the rendered image. In some embodiments, if the pose difference is below a difference threshold, then a subsequent graphical adjustment may comprise a pixel offset adjustment. If the pose difference is greater than or equal to the difference threshold, then the subsequent graphical adjustment may comprise a homography.

In step 710, an updated image is generated based on the pose difference and at least a portion of the rendered image. The updated image may be generated via a homographic transformation of a portion of the rendered image. In some cases, the homographic transformation may comprise a multi-plane homography, a single plane homography, and/or an affine homography. The updated image may also be generated using a pixel offset adjustment or a combination of homographic transformations and pixel offset adjustments. In some cases, the homographic transformations and/or pixel offset adjustments may be generated using a controller or processor integrated with a display of the HMD or using custom circuitry integrated within the display. In one embodiment, the pixel offset adjustments may be performed using a display of the HMD that incorporates shift registers or other circuitry for allowing the shifting of pixel values within a pixel array of the display. In step 712, the updated image is displayed on the HMD. The updated image may be displayed using an OLED display or an LCOS display integrated with the HMD.

Figure 7B:
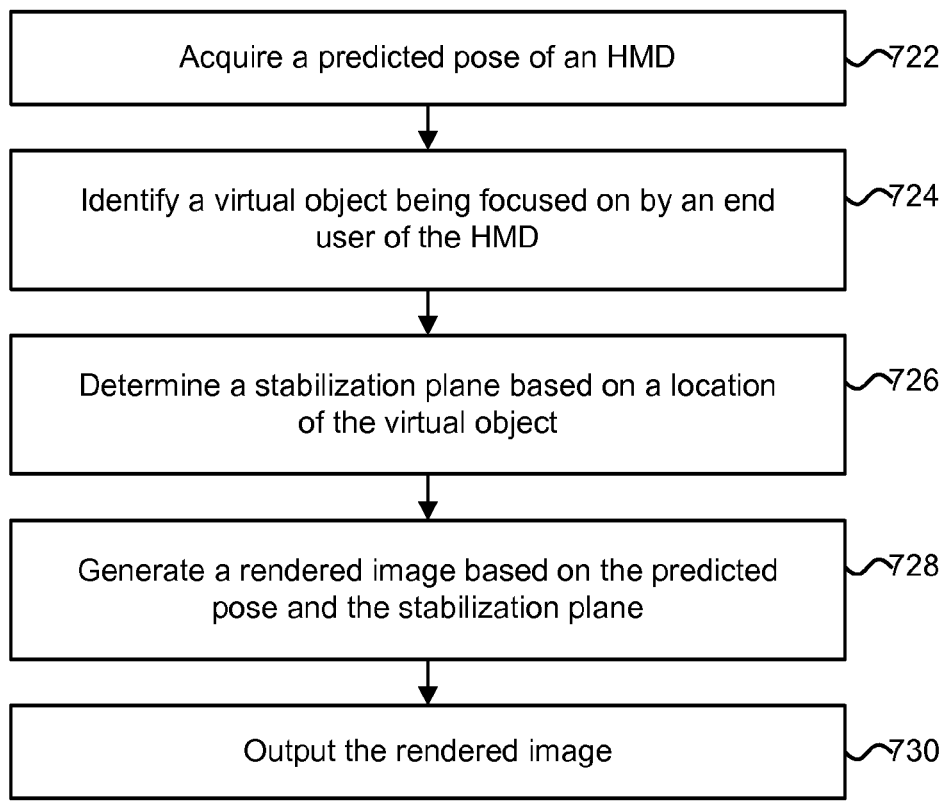
FIG. 7B is a flowchart describing one embodiment of a process for generating a rendered image.

FIG. 7B is a flowchart describing one embodiment of a process for generating a rendered image. The process described in FIG. 7B is one example of a process for implementing step 704 in FIG. 7A. In one embodiment, the process of FIG. 7B may be performed by an HMD, such as mobile device 19 in FIG. 1.

In step 722, a predicted pose of an HMD is acquired. The predicted pose may be acquired by querying a pose estimation module, such as pose estimation module 312 in FIG. 3A. In step 724, a virtual object being focused on by an end user of the HMD is identified. In one embodiment, eye tracking may be used to determine a set of viewed virtual objects focused on by the end user within a particular period of time. The virtual object may be identified as the most frequently viewed virtual object of the sets of viewed virtual objects. The virtual object may be associated with a depth or distance from the HMD.

In step 726, a stabilization plane is determined based on a location of the virtual object within an augmented reality environment. The stabilization plane may coincide with the location of the virtual object within the augmented reality environment. In this case, stabilization planes (and corresponding rendered images) may be determined on-the-fly as the end user shifts their focus among virtual objects within the augmented reality environment over time (i.e., the location of the stabilization plane within the augmented reality environment may shift based on the location of the most frequently viewed virtual object within the augmented reality environment during a particular period of time). In step 728, a rendered image is generated based on the predicted pose and the stabilization plane. The rendered image may comprise a two-dimensional image within the stabilization plane. In step 730, the rendered image is outputted.

One embodiment of the disclosed technology includes one or more processors in communication with a see-through display. The one or more processors determine a predicted pose associated with the mobile device. The predicted pose corresponds with a first point in time. The one or more processors generate a rendered image based on the predicted pose and determine an updated pose associated with the mobile device subsequent to determining the predicted pose. The updated pose corresponds with the first point in time. The see-through display generates an updated image based on the updated pose and the rendered image. The see-through display displays the updated image.

One embodiment of the disclosed technology includes determining a predicted pose associated with a mobile device. The predicted pose corresponds with a first point in time. The method further comprises generating a rendered image based on the predicted pose and determining an updated pose associated with the mobile device subsequent to the generating a rendered image. The updated pose corresponds with the first point in time. The method further comprises determining a pose difference between the predicted pose and the updated pose, generating an updated image based on the pose difference, and displaying the updated image on a display of the mobile device.

One embodiment of the disclosed technology includes acquiring a pose history associated with the HMD. The pose history corresponds with a time period prior to a first point in time. The method further comprises determining a current pose associated with the HMD corresponding with the first point in time and determining a predicted pose associated with the HMD corresponding with a second point in time subsequent to the first point in time. The determining a predicted pose includes determining the predicted pose based on the current pose and the pose history. The method further comprises generating a rendered image based on the predicted pose, determining an updated pose associated with the HMD corresponding with the second point in time, generating an updated image based on the updated pose and at least a portion of the rendered image, and displaying the updated image on a display of the HMD.

Figure 8:
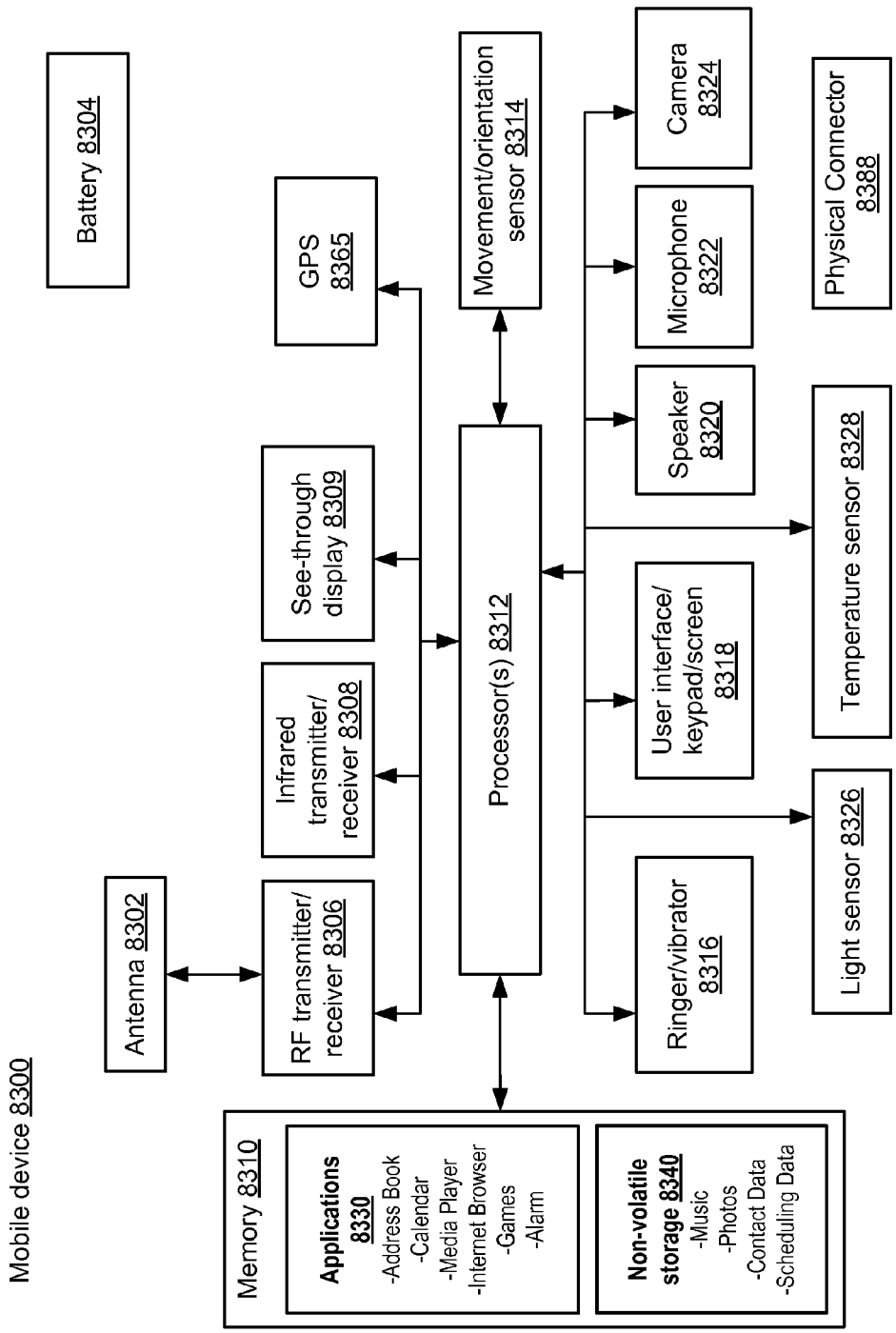
FIG. 8 is a block diagram of one embodiment of a mobile device.

FIG. 8 is a block diagram of one embodiment of a mobile device 8300, such as mobile device 19 in FIG. 1. Mobile devices may include laptop computers, pocket computers, mobile phones, HMDs, personal digital assistants, and hand-held media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device, comprising:
one or more processors configured to determine a first predicted pose and a second predicted pose associated with the mobile device, the first predicted pose corresponds with a first point in time and the second predicted pose corresponds with a second point in time subsequent to the first point in time, the one or more processors configured to acquire a rendered image, the one or more processors configured to determine a first homographic transformation based on the first predicted pose and determine a second homographic transformation based on the second predicted pose, the one or more processors configured to generate a first portion of an updated image by causing the first homographic transformation to be applied to a first portion of the rendered image and generate a second portion of the updated image by causing the second homographic transformation to be applied to a second portion of the rendered image; and
a see-through display configured to display the updated image.

2. The mobile device of claim 1, wherein:
the see-through display configured to generate the first portion of the updated image by applying a first pixel offset adjustment to the first portion of the rendered image and to generate the second portion of the updated image by applying a second pixel offset different from the first pixel offset to the second portion of the rendered image.

3. The mobile device of claim 2, wherein:
the see-through display configured to apply the first pixel offset adjustment by loading a first image associated with the first portion of the rendered image into a pixel array of the see-through display and shifting the first image while the first image is stored within the pixel array using circuitry integrated within the pixel array.

4. The mobile device of claim 2, wherein:
the see-through display configured to apply the first pixel offset adjustment by loading a first image associated with the first portion of the rendered image into a buffer of the see-through display and shifting the first image within the buffer.

5. The mobile device of claim 1, wherein:
the one or more processors configured to generate the second portion of the updated image while the first portion of the updated image is displayed using the see-through display.

6. The mobile device of claim 1, wherein:
the first homographic transformation comprises an affine transformation.

7. The mobile device of claim 1, wherein:
the mobile device comprises a head-mounted display device; and
the see-through display comprises an OLED display.

8. A method for displaying images, comprising:
determining a first predicted pose and a second predicted pose associated with a mobile device, the first predicted pose corresponds with a first point in time and the second predicted pose corresponds with a second point in time subsequent to the first point in time;
acquiring a rendered image;
determining a first homographic transformation to be applied to a first portion of the rendered image based on the first predicted pose;
determining a second homographic transformation to be applied to a second portion of the rendered image based on the second predicted pose;
generating a first portion of an updated image by applying the first homographic transformation to the first portion of the rendered image using the mobile device;

generating a second portion of the updated image by applying the second homographic transformation to the second portion of the rendered image using the mobile device; and displaying the updated image on a display of the mobile device.

9. The method of claim 8, wherein:

the generating the first portion of the updated image includes-applying a first pixel offset adjustment to the first portion of the rendered image; and the generating the second portion of the updated image includes applying a second pixel offset different from the first pixel offset to the second portion of the rendered image.

10. The method of claim 9, wherein:

the applying the first pixel offset adjustment includes loading a first image associated with the first portion of the rendered image into a pixel array of the display and shifting the first image while the first image is stored within the pixel array using circuitry integrated within the pixel array.

11. The method of claim 9, wherein:

the applying the first pixel offset adjustment includes loading a first image associated with the first portion of the rendered image into a buffer of the display and shifting the first image within the buffer.

12. The method of claim 8, wherein:

the generating the second portion of the updated image includes generating the second portion of the updated image while the first portion of the updated image is displayed using the display.

13. The method of claim 8, wherein:

the first homographic transformation comprises an affine transformation.

14. The method of claim 8, further comprising:

acquiring a pose history associated with the mobile device; and determining a current pose of the mobile device prior to the determining the first predicted pose, the determining the first predicted pose includes determining the first predicted pose based on the current pose and the pose history.

15. The method of claim 14, wherein:

the pose history includes an acceleration and a velocity of the mobile device prior to determining the first predicted pose.

16. The method of claim 8, wherein:

the mobile device comprises a head-mounted display device; and the display comprises an OLED display.

17. One or more storage devices containing processor readable code for programming one or more processors to perform a method for displaying images using an HMD comprising the steps of:

acquiring a pose history associated with the HMD, the pose history corresponds with a time period prior to a first point in time;

determining a current pose associated with the HMD corresponding with the first point in time;

determining a first predicted pose associated with the HMD corresponding with a second point in time subsequent to the first point in time, the determining a first predicted pose includes determining the first predicted pose based on the current pose and the pose history;

determining a second predicted pose associated with the HMD corresponding with a third point in time subsequent to the second point in time;

acquiring a rendered image;

determining a first homographic transformation to be applied to a first portion of the rendered image based on the first predicted pose;

determining a second homographic transformation to be applied to a second portion of the rendered image based on the second predicted pose;

generating a first portion of an updated image by applying the first homographic transformation to the first portion of the rendered image;

generating a second portion of the updated image by applying the second homographic transformation to the second portion of the rendered image; and displaying the updated image on a display of the HMD.

18. The one or more storage devices of claim 17, wherein:

the generating the first portion of the updated image includes loading a first image associated with the first portion of the rendered image into a pixel array of the display and shifting the first image while the first image is stored within the pixel array using circuitry integrated within the pixel array.

19. The one or more storage devices of claim 17, wherein:

the generating the first portion of the updated image includes loading a first image associated with the first portion of the rendered image into a pixel array of the display and shifting the first image in both a first pixel direction and a second pixel direction orthogonal to the first pixel direction while the first image is stored within the pixel array using circuitry integrated within the pixel array.

20. The one or more storage devices of claim 17, wherein:

the generating the second portion of the updated image includes generating the second portion of the updated image while the first portion of the updated image is displayed using the display.

* * * * *